(12) United States Patent
Szigeti et al.

(10) Patent No.: US 11,985,107 B2
(45) Date of Patent: *May 14, 2024

(54) MICROSERVICE VISIBILITY AND CONTROL

(71) Applicant: Cisco Technology, Inc., San Jose, CA (US)

(72) Inventors: Thomas Szigeti, Vancouver (CA); David John Zacks, Vancouver (CA); Akram Ismail Sheriff, San Jose (CA); Guy Keinan, Kfar-Saba (IL); Walter T. Hulick, Jr., Pearland, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,979

(22) Filed: Feb. 3, 2023

(65) Prior Publication Data
US 2023/0188496 A1    Jun. 15, 2023

Related U.S. Application Data

(63) Continuation of application No. 17/493,099, filed on Oct. 4, 2021, now Pat. No. 11,601,393.

(51) Int. Cl.
*H04L 61/4511* (2022.01)

(52) U.S. Cl.
CPC ................ *H04L 61/4511* (2022.05)

(58) Field of Classification Search
CPC ............ H04L 61/4511; H04L 61/4541
See application file for complete search history.

(56) References Cited

U.S. PATENT DOCUMENTS

| 10,764,244 | B1* | 9/2020 | Mestery | H04L 61/2592 |
| 10,944,691 | B1 | 3/2021 | Raut et al. | |
| 11,288,109 | B2* | 3/2022 | Shah | G06F 9/546 |
| 2006/0116138 | A1* | 6/2006 | Simsek | H04W 4/14 |
| | | | | 455/466 |
| 2009/0262741 | A1* | 10/2009 | Jungck | H04L 41/5054 |
| | | | | 370/392 |

(Continued)

OTHER PUBLICATIONS

Tyszberowicz, S. et al., "Identifying Microservices Using Functional Decomposition," 4th International Symposium on Dependable Software Engineering: Theories, Tools, and Applications, SETTA 2018, Sep. 2018, 16 pages.

(Continued)

*Primary Examiner* — Jimmy H Tran
(74) *Attorney, Agent, or Firm* — Edell, Shapiro & Finnan, LLC

(57) ABSTRACT

Methods are provided in which a domain name system (DNS) service obtains a lookup request for information about a source of a traffic flow being transmitted to a network resource external of a service cluster and performs, based on the lookup request, a lookup operation for a microservice that is the source of the traffic flow, among a plurality of microservices of the service cluster registered with the DNS service. The methods further include providing information about the microservice based on the lookup operation. The information includes at least a name of the microservice for visibility of the microservice external of the service cluster.

20 Claims, 10 Drawing Sheets

(56) References Cited

U.S. PATENT DOCUMENTS

| | | | |
|---|---|---|---|
| 2016/0036857 A1* | 2/2016 | Foxhoven | G06F 12/0815 726/1 |
| 2016/0164825 A1* | 6/2016 | Riedel | H04L 43/026 709/223 |
| 2017/0063833 A1* | 3/2017 | Colle | G06F 21/6218 |
| 2018/0041484 A1* | 2/2018 | Gifford | H04L 9/0825 |
| 2018/0113790 A1* | 4/2018 | Chunduri | G06F 11/3664 |
| 2018/0121221 A1* | 5/2018 | Ahuja | H04L 63/02 |
| 2018/0152534 A1* | 5/2018 | Kristiansson | H04L 67/1031 |
| 2018/0203746 A1* | 7/2018 | Lincoln | G06F 9/541 |
| 2018/0343281 A1* | 11/2018 | Ahuja | H04L 63/1425 |
| 2019/0052658 A1* | 2/2019 | Clarke | H04L 63/1425 |
| 2019/0058761 A1* | 2/2019 | Hassan | H04L 67/1012 |
| 2019/0123970 A1* | 4/2019 | Rastogi | H04L 43/20 |
| 2019/0155597 A1* | 5/2019 | Lander | G06F 11/3688 |
| 2019/0268305 A1* | 8/2019 | Xu | H04L 61/5007 |
| 2019/0340059 A1* | 11/2019 | Bagarolo | G06F 8/71 |
| 2020/0019388 A1* | 1/2020 | Jaeger | G06F 8/4441 |
| 2020/0110667 A1* | 4/2020 | Al-Alem | G06F 11/1438 |
| 2020/0120168 A1* | 4/2020 | Nainar | H04L 45/30 |
| 2020/0137021 A1* | 4/2020 | Janakiraman | H04L 63/10 |
| 2020/0137024 A1* | 4/2020 | Janakiraman | H04L 63/0236 |
| 2020/0137093 A1* | 4/2020 | Janakiraman | H04L 63/0263 |
| 2020/0137094 A1* | 4/2020 | Janakiraman | G06N 20/00 |
| 2020/0137115 A1* | 4/2020 | Janakiraman | H04L 43/028 |
| 2020/0192690 A1 | 6/2020 | Gupta et al. | |
| 2020/0334068 A1* | 10/2020 | Krishnamurthy | H04L 41/0893 |
| 2020/0344123 A1* | 10/2020 | Prendergast | H04L 67/34 |
| 2020/0348921 A1* | 11/2020 | Maréchal | G06F 8/65 |
| 2020/0351244 A1 | 11/2020 | Moore et al. | |
| 2020/0396178 A1* | 12/2020 | Mestery | H04L 61/5014 |
| 2021/0014328 A1* | 1/2021 | Singhal | H04L 63/166 |
| 2021/0019194 A1* | 1/2021 | Bahl | H04L 67/1031 |
| 2021/0021634 A1* | 1/2021 | Babakian | H04L 61/2567 |
| 2021/0119962 A1* | 4/2021 | Ramia | H04L 65/612 |
| 2021/0126840 A1* | 4/2021 | Venkataramu | H04L 41/5019 |
| 2021/0165679 A1* | 6/2021 | Oezmen | G06F 11/0793 |
| 2021/0168150 A1* | 6/2021 | Ross | G06F 16/9024 |
| 2021/0271489 A1* | 9/2021 | Singhal | G06F 8/63 |
| 2021/0367944 A1* | 11/2021 | Gupta | H04L 67/56 |
| 2021/0385290 A1* | 12/2021 | Edamadaka | H04L 67/14 |
| 2021/0390002 A1* | 12/2021 | Shah | G06F 9/5072 |
| 2022/0027192 A1* | 1/2022 | Nikain | G06F 9/4843 |
| 2022/0038554 A1* | 2/2022 | Merwaday | H04L 67/63 |
| 2022/0150113 A1* | 5/2022 | A | H04L 41/0803 |
| 2022/0232042 A1* | 7/2022 | Crabtree | H04L 63/1425 |
| 2022/0279046 A1* | 9/2022 | Perng | H04L 67/133 |
| 2022/0286362 A1* | 9/2022 | Gamliel | G06F 16/9024 |
| 2022/0292080 A1* | 9/2022 | Rao | G06F 16/2358 |
| 2022/0292117 A1* | 9/2022 | Rao | G06N 5/02 |
| 2022/0329616 A1* | 10/2022 | O'Hearn | H04L 63/10 |
| 2022/0342718 A1* | 10/2022 | Iqbal | H04L 67/63 |
| 2023/0188496 A1* | 6/2023 | Szigeti | H04L 61/4511 709/245 |
| 2023/0396579 A1* | 12/2023 | Baker | H04L 61/2514 |

OTHER PUBLICATIONS

Schröer, C., et al, "A Qualitative Literature Review on Microservices Identification Approaches," Communications in Computer and Information Science, vol. 1310, Dec. 2020, 18 pages.

Li, S., et al, "A dataflow-driven approach to identifying microservices from monolithic applications," Journal of Systems and Software, vol. 157, Nov. 2019, 16 pages.

* cited by examiner

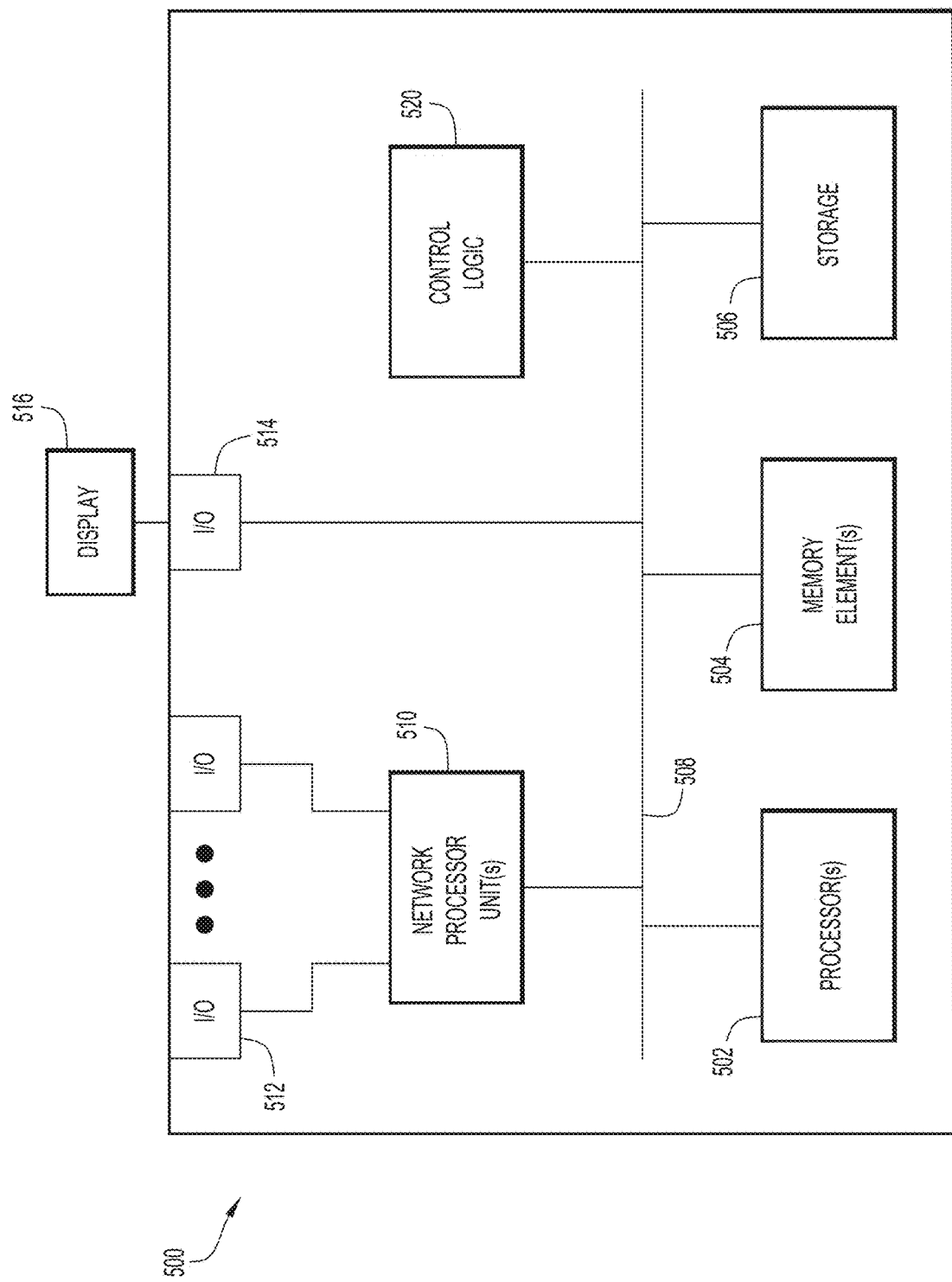

MICROSERVICE VISIBILITY AND CONTROL

CROSS REFERENCE TO RELATED APPLICATION

This application is a continuation of U.S. patent application Ser. No. 17/493,099, filed Oct. 4, 2021, which issued as U.S. Pat. No. 11,601,393, the entirety of which is incorporated herein by reference for all purposes.

TECHNICAL FIELD

The present disclosure relates to computer networks and systems.

BACKGROUND

Enterprise services may be provided in a form of one or more software applications. Network and security visibility and enterprise policies are applied at the application level, leveraging tools such as Application Visibility and Control (AVC). Enterprise services may be provided in a form of monolithic applications that are tightly coupled to physical and/or virtual machines. That is, a monolithic application is executed on a dedicated server. With recent advances in virtualization and containerization technologies, the enterprise services are transforming from monolithic applications to microservice-based cloud native architectures. Instead of a monolithic application, a collection of loosely-coupled services may be used by an enterprise and may be deployed on different physical and/or virtual machines. These discrete microservices communicate with one another using various application programming interfaces (APIs).

BRIEF DESCRIPTION OF THE DRAWINGS

FIG. 5 is a hardware block diagram of a computing device that may perform functions associated with any combination of operations in connection with the techniques depicted and described in FIGS. 1-4.

DESCRIPTION OF EXAMPLE EMBODIMENTS

Overview

Briefly, methods are presented for disseminating microservices information to external network devices using metadata and thus allowing for a microservice level visibility and/or granularity for application policies such as path selection or quality of service and other uses such as troubleshooting, analytics, and statistics.

In one example, a method is provided that includes obtaining, by a domain name system (DNS) service, a lookup request for information about a source of a traffic flow being transmitted to a network resource external of a service cluster and performing, based on the lookup request, a lookup operation for a microservice that is the source of the traffic flow, among a plurality of microservices of the service cluster registered with the DNS service. The method further includes providing information about the microservice based on the lookup operation. The information includes at least a name of the microservice for visibility of the microservice external of the service cluster.

Example Embodiments

When enterprise services are provided as monolithic applications, they are easy to locate and identify for various purposes such as applying enterprise security policies. Monolithic applications are typically hosted on a physical or virtual machine in an on-premises data center. As such, network layer protocol (L3) parameters and/or transport layer protocol (L4) parameters may be used to identify the monolithic application. For example, IP address(es) and/or Transmission Control Protocol (TCP)/User Datagram Protocol (UDP) ports are used to identify monolithic applications because they are static and unchangeable. When these parameters are unknown or insufficient in identifying the enterprise service, for example, when deployed as a web application that shares the same TCP port 80 with other web applications, then the enterprise service is identified using application layer (L7) protocol parameters. Specifically, the AVC or Software Defined (SD) AVC, deployed at various network devices, identifies L7 parameters of the enterprise service. When the enterprise service is deployed as a microservice-based cloud native architecture, challenges of identifying this enterprise service has radically changed and increased in complexity.

The techniques presented herein obtain, by a Domain Name System (DNS) service, at least a microservice name, and preferably annotations or metadata that describe a microservice, and disseminate the microservice's information to external network devices, thus allowing for microservice level visibility and/or granularity for application policies (path selection, quality of service, etc.) and other uses (troubleshooting, statistics, etc.).

Figure 1:
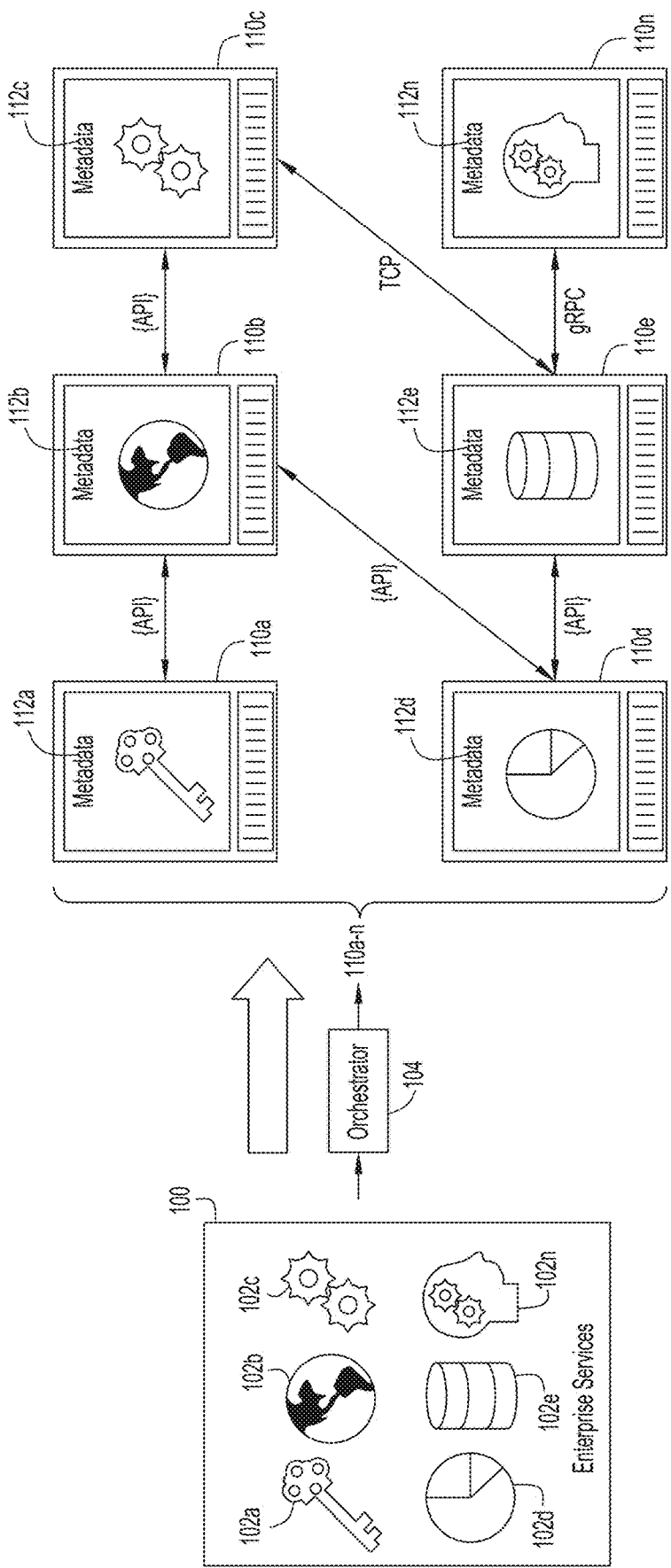
FIG. 1 is a block diagram illustrating an enterprise service being deployed as a microservice-based architecture in which components are individually identifiable using metadata, according to an example embodiment.

FIG. 1 is a block diagram illustrating an enterprise service 100 being deployed as a microservice-based architecture in which components are individually identifiable using metadata, according to an example embodiment.

The enterprise service 100 includes components 102*a-n* being deployed as microservices 110*a-n* using an orchestrator 104. The orchestrator 104 obtains information about the enterprise service 100 and generates various containers to host the components 102*a-n*. The containers are isolated from one another, but together form a cluster with the aid of the orchestrator 104. Some non-limiting examples of the orchestrator 104 are Kubernetes and Docker. As noted above, the orchestrator 104 obtains information about the enterprise service 100 including its components 102*a-n* (e.g., a first security component 102*a*, a second network access component 102*b*, a third settings component 102*c*, a fourth services component 102*d*, a fifth storage component 102*e*, and a sixth processing component 102*n*), relationship or interconnections of the components 102*a-n*, and instances of the components 102*a-n* needed. The orchestrator 104 generates the cluster with the microservices 110*a-n* being containerized and communicating with one another using various Application Programming Interfaces (APIs), such as TCP protocol and/or Remote Procedure Call (RPC) protocol. The microservices 110*a-n* include a first security microservice 110*a*, a second network access microservice 110*b*, a third settings microservice 110c, a fourth services microservice 110d, a fifth storage microservice 110e, and a sixth processing microservice 110n.

The notations 1, 2, 3, ... n and a, b, c, n illustrate that the number of elements can vary depending on a particular implementation and is not limited to the number of elements depicted being depicted or described.

Since the microservices 110a-n are deployed using cloud native architecture, Internet Protocol (IP) addresses cannot be used to identity these microservices 110a-n. For example, the IP addresses are unreliable due to being in-flux and constantly changing and because they may be subject to Network Address Translation (NAT), as data traffic leaves the cluster. The L4 Ports are similarly insufficient to identify these microservices 110a-n because myriads of web applications share the TCP port 80. Additionally, when traffic leaves a cluster, the traffic is encrypted, which severely limits the ability for downstream devices to leverage AVC and/or SD-AVC to perform L7 inspection on these flows.

The migration of the enterprise services from monolithic applications to microservice-based cloud native architectures presents a challenge as to how to identify the enterprise service 100 and its components 102a-n to apply enterprise network and security policies beyond internal management environment (a service cluster). The techniques presented herein add metadata 112a-n to the microservices 110a-n. The metadata 112a-n provides identification of the microservices 110a-n external to the formed cluster, as detailed below. The metadata 112a-n includes a first metadata 112a, a second metadata 112b, a third metadata 112c, a fourth metadata 112d, a fifth metadata 112e, and a sixth metadata 112n. For example, the first metadata 112a may identify the first security microservice 110a as being related to authentication and/or security.

Figure 2:
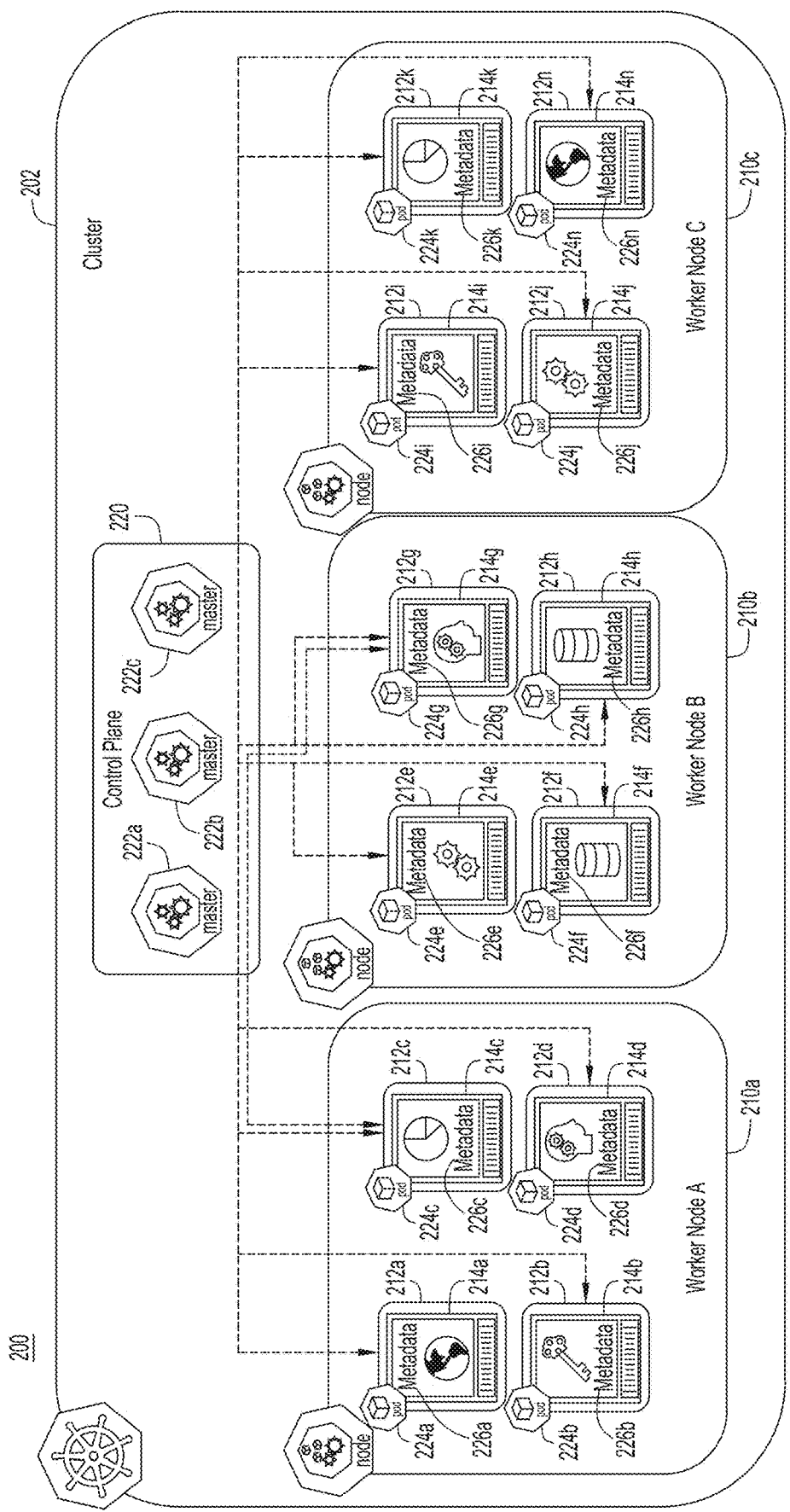
FIG. 2 is a block diagram illustrating an environment in which microservices with identifying metadata are deployed, according to an example embodiment.

FIG. 2 is a block diagram illustrating an environment 200 in which microservices having identifying metadata are deployed, according to an example embodiment. The environment 200 includes a service cluster (cluster) 202, worker nodes 210a-c and a control plane 220. The worker nodes 210a-c include a worker node A 210a, a worker node B 210b, and a worker node C 210c. The worker nodes 210a-c run containers 212a-n that host microservices 214a-n.

Specifically, the worker node A 210a runs a first container 212a that hosts a first microservice 214a, a second container 212b that hosts a second microservice 214b, a third container 212c that hosts a third microservice 214c, and a fourth container 212d that hosts a fourth microservice 214d. The worker node B 210b runs a fifth container 212e that hosts a fifth microservice 214e, a sixth container 212f that hosts a sixth microservice 214f, a seventh container 212g that hosts a seventh microservice 214g, and an eight container 212h that hosts an eighth microservice 214h. The worker node C 210c runs a ninth container 212i that hosts a ninth microservice 214i, a tenth container 212j that hosts a tenth microservice 214j, an eleventh container 212k that hosts an eleventh microservice 214k, and a twelfth container 212n that hosts a twelfth microservice 214n.

The control plane 220 includes master nodes 222a-c (first master node 222a, a second master node 222b, and a third master node 222c) that form a management system for the cluster 202.

The worker nodes 210a-c and the master nodes 222a-c may be embodied by computer hardware. To manage the containers 212a-n, the control plane 220 adds a thin layer of management wrapping, thus producing a point-of-delivery (pod). One pod per each container. For example, the worker node A 210a includes a first pod 224a, a second pod 224b, a third pod 224c, and a fourth pod 224d. The worker node B 210b includes a fifth pod 224e, a sixth pod 224f, a seventh pod 224g, and an eighth pod 224h. The worker node C 210c includes a ninth pod 224i, a tenth pod 224j, an eleventh pod 224k, and a twelfth pod 224n. The pods, shown at 224a-n, are in a constant state of flux, being spun up, spun down, replicated, or replaced by the controllers (the master nodes 222a-c), as these continually adapt to ensure that the current observed state matches the desired state of operation. In other words, in addition to being complex and interdependent, another challenge presented by cloud native architectures is the dynamic and ephemeral nature of the pods 224a-n that host containerized microservices 214a-n of which the applications are composed.

Furthermore, by default, traffic is unencrypted within the cluster 202. However, an increasing number of users prefer to encrypt these intra-cluster flows as well, and as such are implementing service mesh technologies to perform mutual Transport Layer Security (mTLS) encryption on these intra-cluster flows, in addition to the encryption performed on inter-cluster flows and external flows. This presents another problem of lack of visibility inside the network or traffic flow. Therefore, the migration of enterprise services applications to microservice-based cloud native architectures with the encryption schemes, adds another wrinkle to identifying the enterprise services, and the discrete microservices 214a-n, so that network and security policy may be applied at the microservice level and beyond the environment 200 or the cluster 202.

In the cluster 202, the microservices 214a-n include respective metadata 226a-n (e.g., a first microservice metadata 226a, a second microservice metadata 226b, a third microservice metadata 226c, a fourth microservice metadata 226d, a fifth microservice metadata 226e, a sixth microservice metadata 226f, a seventh microservice metadata 226g, an eight microservice metadata 226h, a ninth microservice metadata 226i, a tenth microservice metadata 226j, an eleventh microservice metadata 226k, and a twelfth microservice metadata 226n). The metadata 226a-n provides visibility at a microservice level (for a respective microservice) and external of the cluster 202.

FIGS. 3A-3F are flow diagrams illustrating stages of a method 300 for providing visibility and control of a microservice external of the cluster 202, according to an example embodiment. Reference is also made to FIG. 2 for purposes of the description of FIGS. 3A-3F. The method 300 further involves a domain name system (DNS) service 310, a network service endpoint (NSE) 320, and an external network device (e.g., a Software Defined (SD)-wide area network (WAN) router 350).

The DNS service 310 may include one or more computing resources such as hardware servers. The DNS service 310 provides service visibility and control (SVC) within the cluster 202. The DNS service 310 dynamically creates DNS records for various microservices 302a-n and their pods. Every microservice, such as the microservice 302a, the microservice 302b, the microservice 302c, and the microservice 302n, is defined in the cluster 202 (including the DNS service 310 itself) and is assigned a DNS name, which is part of metadata 304a-n (e.g., first microservice specific metadata 304a, second microservice specific metadata 304b, third microservice specific metadata 304c, and fourth microservice specific metadata 304n). Within the cluster 202, the microservices 302a-n can be reached with consistent DNS names instead of IP addresses.

The control plane 220 configures nodes such as the worker node A 210a, via a node agent, (e.g., kubelet) to inform individual containers hosting the microservices 302*a-n* to use the DNS service 310 to resolve IP address to DNS name and vice versa. When the DNS name for a service is received, connectivity to a desired microservice is typically handled through a load-balancer (not shown), which resolves a service DNS name to one or more pods IP addresses that are currently running the desired microservice. The DNS service 310 may play an important role in the intra-cluster operation of the environment 200, and more particularly, in locating and identifying a particular microservice in the cluster 202.

The DNS service 310 also plays a role in inter-cluster communications for the microservices 302*a-n*. For instance, the microservices 302*a-n* registered in the cluster 202 can share their DNS records with an application service gateway, which can selectively discover and advertise these microservices 302*a-n* into another cluster (not shown), even if these clusters are running disparate service meshes.

The NSE 320 is network service mesh (NSM) construct that allows the pod 306 that hosts the microservice 302*c* to interconnect with network devices that may be external to the cluster 202, provided a software development kit (SDK) is implemented. Specifically, the NSE 320 connects to the SD-WAN router 350. The NSE 320 provides customized and tailored connections using container network interface (CM). The NSE 320 added to the worker node A 210*a* emulates network functions for custom interfaces.

The method 300 uses application microservice metadata (metadata 304*a-n*) to drive one or more network policies for the microservices 302*a-n*. In one example embodiment, the metadata 304*a-n* is generated by application developers (which provides a cloud native interface for driving application microservice differentiation) and is shared with external network infrastructure devices using the DNS service 310.

Figure 3A:
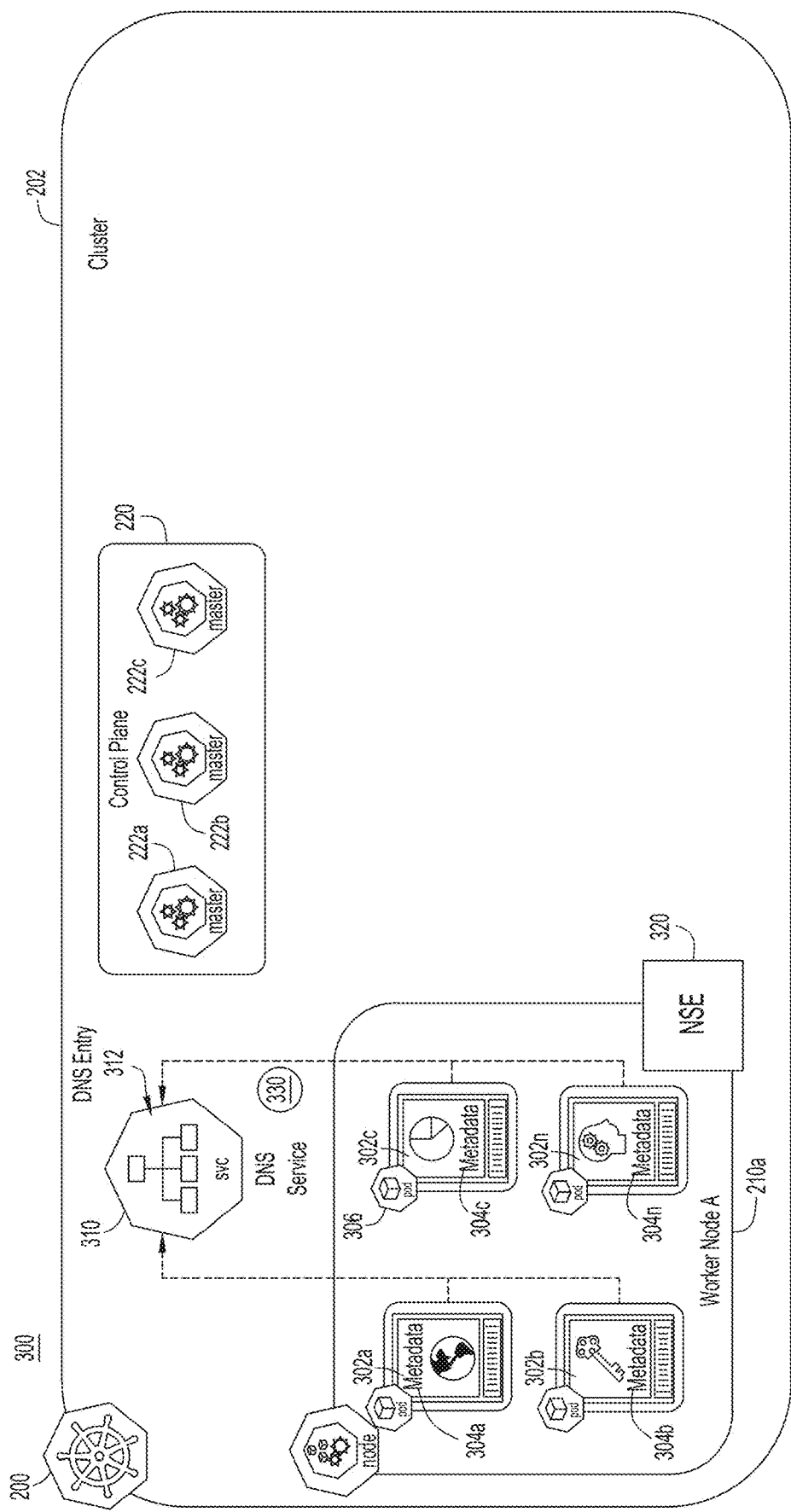
FIGS. 3A-3F are flow diagrams illustrating stages of a method for providing visibility of a microservice external of a service cluster, according to an example embodiment.

FIG. 3A is a flow diagram illustrating a registration operation 330 of the method 300, which includes registering microservices 302*a-n* with the DNS service 310, according to an example embodiment.

The registration operation 330 involves spinning up a pod 306 in which containerized application microservice 302*c* is running. The registration operation 330 further involves, registering the microservice 302*c* with the DNS service 310. Specifically, a registration request may request a name for the microservice 302*c* and/or network information such as its IP address. The DNS service 310 then generates a record or a DNS entry 312 with network address translation (NAT) information that includes a mapping of the name of the microservice 302*c* with its network information (IP address).

Figure 3B:
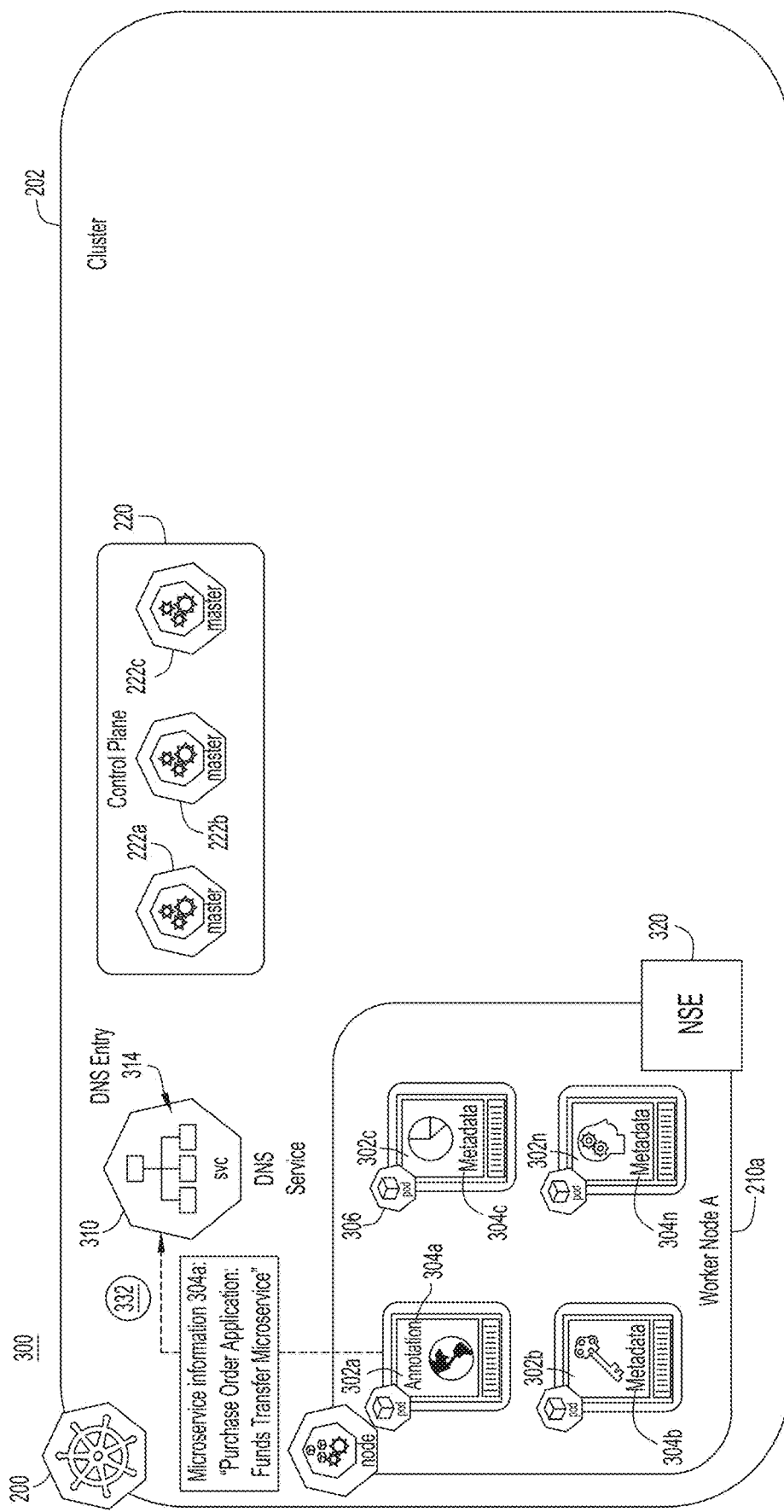

FIG. 3B is a flow diagram illustrating an operation 332 of the method 300, which includes adding microservice information to a DNS entry, according to an example embodiment.

In one example embodiment, a developer of the microservice 302*a* may include an annotation as the first microservice specific metadata 304*a* that has information about the microservice 302*a*. For example, the annotation may be in a following form:
  apiVersion: v1
  kind: Pod
  metadata:
    name: annotations-demo
    annotations:
      dns-microservice-metadata: "Purchase Order Application: Fund Transfer Microservice."

The above is a non-limiting example. Microservice information may be in other formats and of various types. For example, the annotation may include keywords defining the microservice 302*a* and the enterprise service to which the microservice 302*a* belongs. As another example, security level, transmission priority level, or even enterprise policy to apply may be included in the annotation. A common naming schema may be used for the annotation. Additionally, tools may be provided to enforce the common naming schema, detect typos, errors, and/or inconsistencies and provide suggested corrections in the annotation.

If a developer included information about the microservice 302*a* within the annotation, then this metadata is added to a DNS entry 314 for the microservice 302*a*. In one example, the DNS entry 314 includes the annotation as a text or textual (txt) record. That is, the DNS service 310 parses the annotation to extract this metadata for the DNS entry 314. When the annotation is structured based on a common naming schema, the parsing is quicker and more accurate.

In one example embodiment, the annotation of the first microservice specific metadata 304*a* describing the microservice 302*a* may be included as part of the registration request described in the registration operation 330 of FIG. 3A.

According to one or more example embodiments, information about a microservice includes various metadata. The metadata may be a name of the microservice obtained during the registration operation 330. The metadata may further include the first microservice specific metadata 304*a* (in a form of the annotation) with additional microservice information obtained during the process of adding microservice information (during the operation 332). In other words, information from the programming environment may be included in DNS records (the DNS entry 314) using the annotation of the first microservice specific metadata 304*a*. Based on the metadata 304*a-n*, microservices 302*a-n* are distinguished from one another at a network level.

Figure 3C:
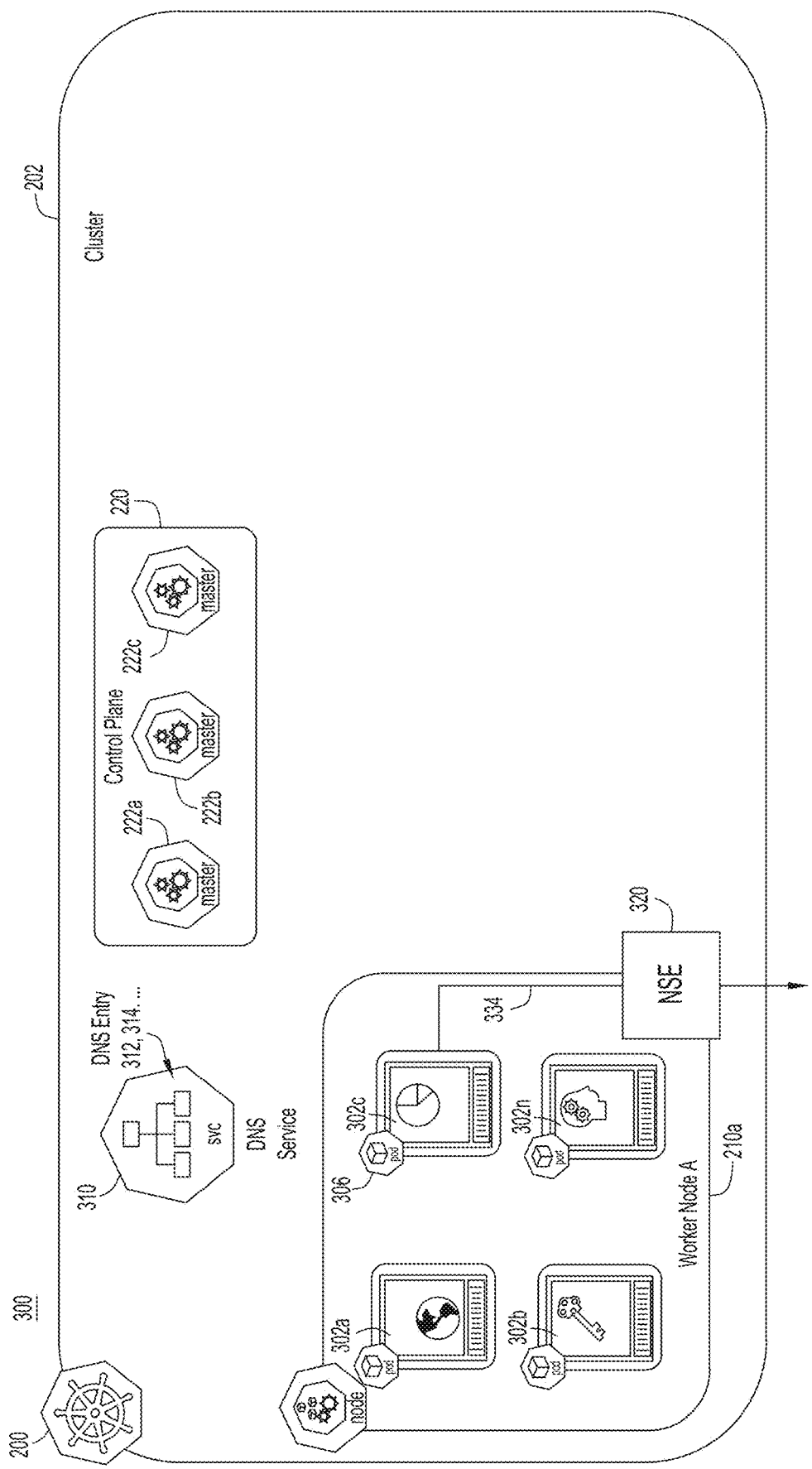

FIG. 3C is a flow diagram illustrating an operation 334 of the method 300, which includes initiating an external connection for a traffic flow of a microservice, according to an example embodiment.

The operation 334 includes initiating a connection, by a pod 306 that hosts the microservice 302*c*, to an external network resource. Specifically, if the pod 306 is connecting to an external network resource that is outside of the cluster 202, the traffic flow is directed from the microservice 302*c* to the NSE 320 of the worker node A 210. The NSE 320 is configured to communicate with external network resources i.e., various network devices using various SDKs.

Figure 3D:
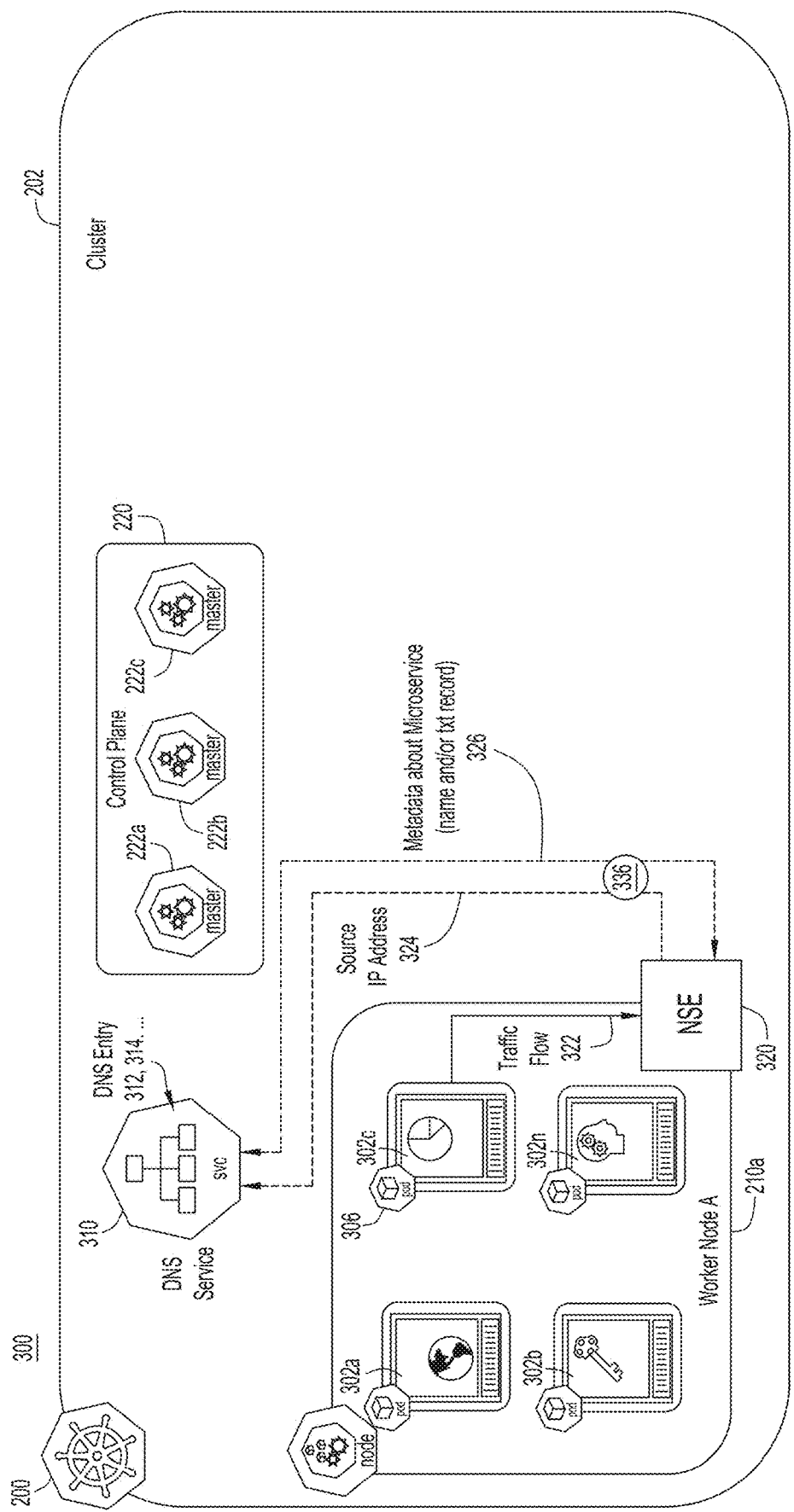

FIG. 3D is a flow diagram illustrating an operation 336 of the method 300, in which the NSE 320 performs a DNS lookup to obtain information about the microservice 302*c*, according to an example embodiment.

The operation 336 involves, the NSE 320 detecting a traffic flow 322 originating from the microservice 302*c*. The NSE 320 determines whether this is a new traffic flow or whether the traffic flow 322 has a source address or network information not previously detected by the NSE 320. Based on determining that the traffic flow 322 is new, the NSE 320 performs a reverse DNS lookup using the source IP address 324 of the traffic flow 322. That is, the NSE 320 extracts the source IP address 324 from the traffic flow 322 and provides it to the DNS service 310 to obtain additional information (metadata) about the source microservice.

The operation 336 further involves the DNS service 310 searching through the DNS records that include the DNS entry 312 for the microservice 302*a* and the DNS entry 314 for the microservice 302*c*, to locate the source IP address 324. The source IP address 324 matches the IP address in the DNS entry 314, the DNS service 310 then returns metadata 326 about the microservice 302c included in the DNS entry 314. The metadata 326 may include the corresponding DNS name of the microservice 302c and may further include additional information (annotation in the DNS txt record).

According to another example embodiment, when a network device, such as the SD-WAN router 350 (e.g., vEdge or cEdge) observes a new traffic flow (DNS flow), the SD-WAN router 350 extracts the DNS domain (using an SD-AVC agent) and sends the extracted DNS domain to the NSE 320. In this example, the NSE 320 is expanded to include an SD-AVC controller function. The NSE 320 can provide any network function or service chain of functions needed. The NSE 320 (via the SD-AVC controller) then performs a direct DNS lookup on the source IP address 324 of the traffic flow. The DNS service 310 returns the microservice IP address and the metadata 326 about the microservice (name and any additional microservice information in the txt record). In this example embodiment, the operation 336 is no longer on a per-flow action but per domain action, e.g. the domain/IP is cached until the time to live (TTL) value of the cached domain/IP expires (and is refreshed with the TTL being extended). This example embodiment of the direct DNS lookup improves the efficiency of the method 300 and solves additional challenges of what happens to the traffic flow 322 until the DNS pointer (PTR) is returned. Further, direct DNS lookups are better supported across different DNS zones. Moreover, if the txt record is returned on a record, and not on a PTR record, this can be inspected in the network layer.

Figure 3E:
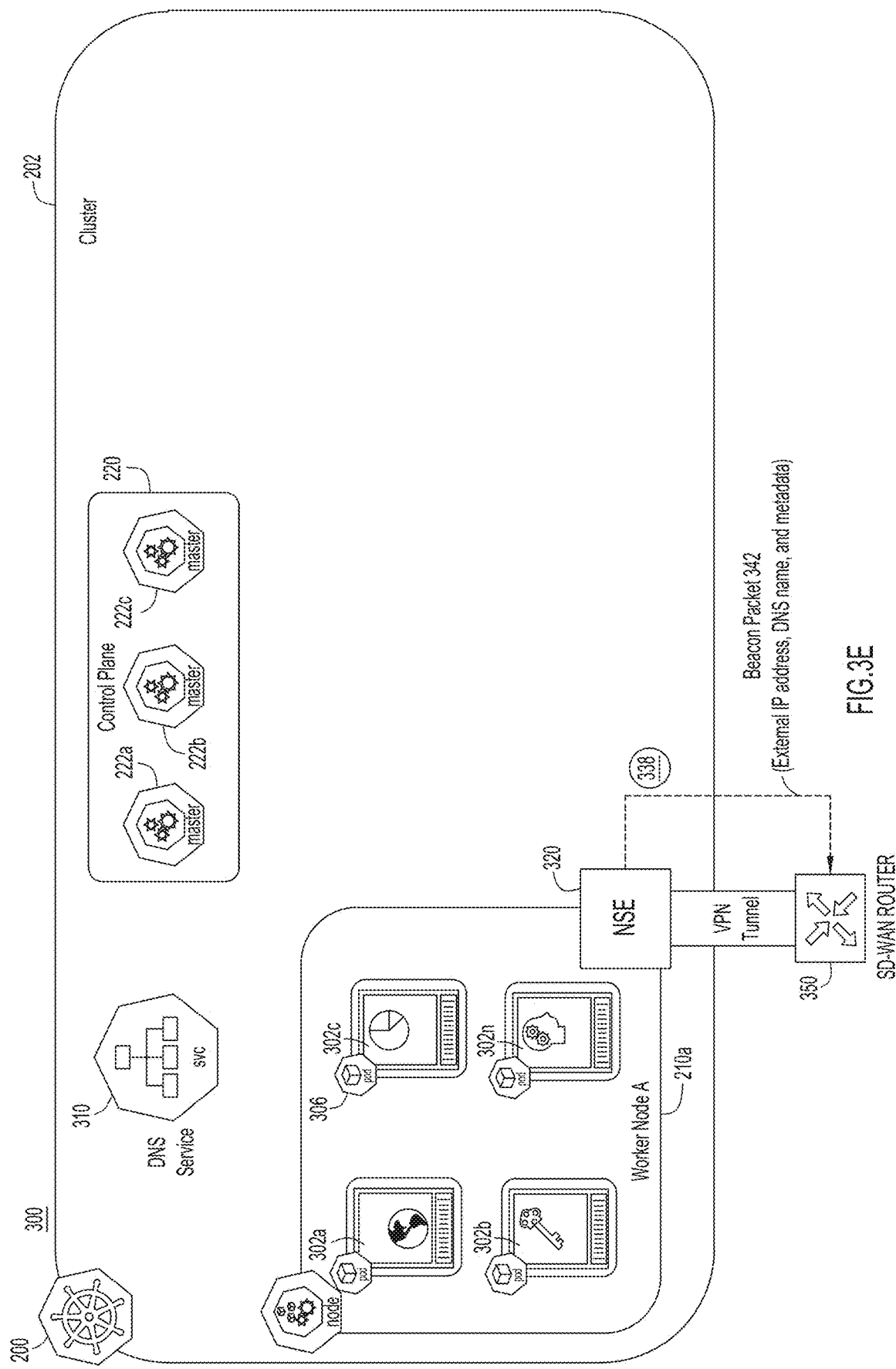

FIG. 3E is a flow diagram illustrating an operation 338 of the method 300, in which information about the microservice 302c is provided to a network device external to the cluster 202, according to an example embodiment. A non-limiting example of the network device is the SD-WAN router 350 such as vEdge router or cEdge router.

The operation 338 includes the NSE 320 generating a beacon packet 342 and sending the beacon packet 342 to one or more downstream network devices, such as the SD-WAN router 350. For example, if a single vEdge or cEdge router is inspecting the beacon packet 342, this information is propagated through SD-AVC to an entire network segment (i.e. to all vEdge or cEdge routers within an enterprise). As another example, the beacon packet 342 is propagated to multiple external network devices. The beacon packet 342 includes an external IP address for the traffic flow 322 of the microservice 302c, the DNS name of the microservice 302c, and any other metadata about the microservice (from the TXT record). The DNS name and other metadata are obtained from the DNS entry 314 stored in the DNS records of the DNS service 310.

As a result of the operations 336 and 338, the microservice 302c obtains microservice level visibility external of the cluster 202. External network devices (the SD-WAN router 350) obtain specific information about the microservice 302c (the third microservice specific metadata 304c) such as its name, functions, description, type of service, and/or type of security level, etc.

Figure 3F:
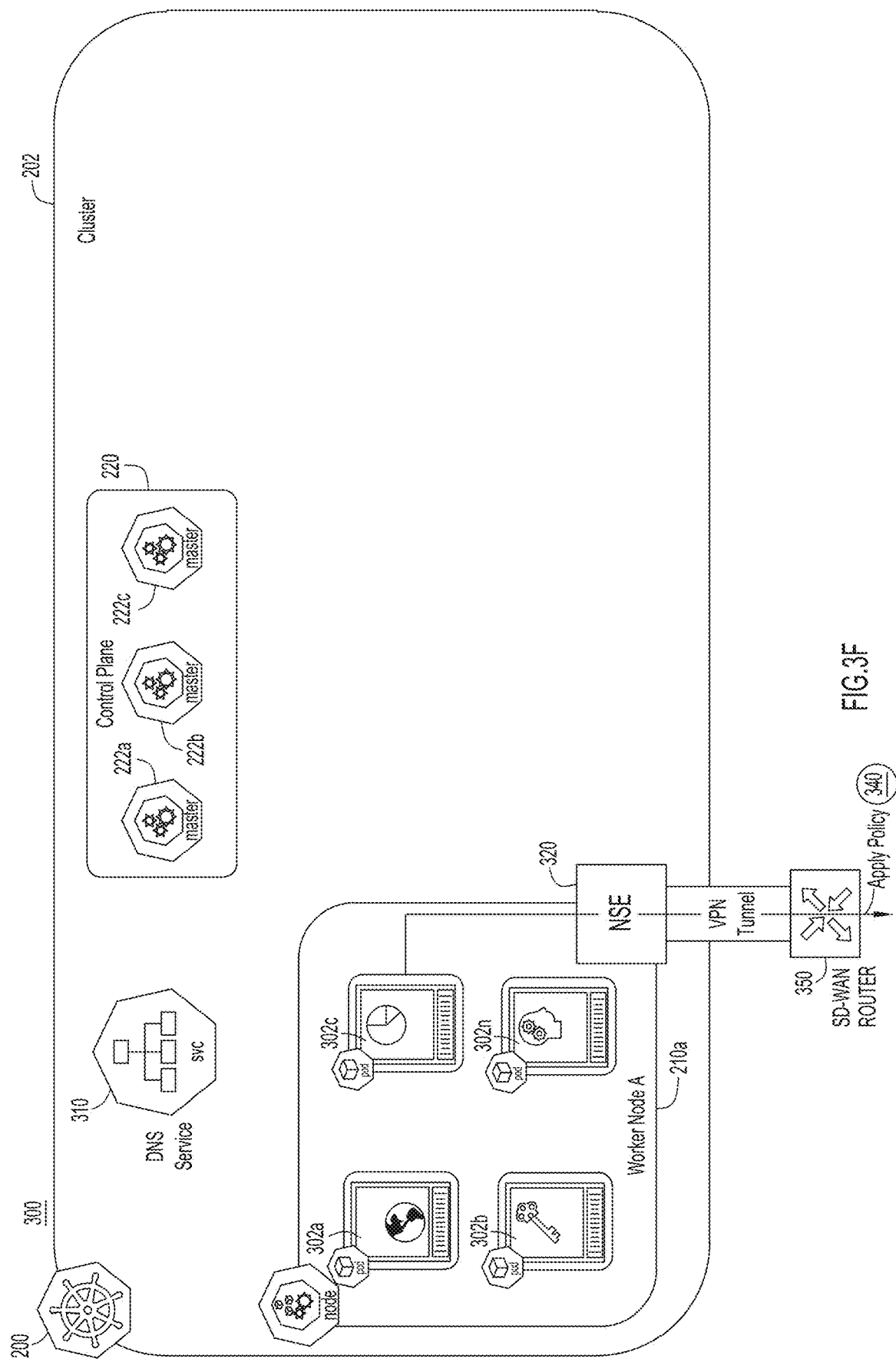

FIG. 3F is a flow diagram illustrating an operation 340 of the method 300, in which the traffic flow of the microservice 302c is controlled based on the metadata 304c, according to an example embodiment.

In one or more example embodiment, the SD-WAN router 350 applies the metadata 304c extracted from the beacon packet 342 to control traffic flows of the microservice 302c. For example, the SD-WAN router 350 receives information about the microservice 302c including the name the microservice 302c and any other information in the third microservice specific metadata 304c that may be available in the txt record of the DNS entry 314, and uses SD-AVC to apply one or more policies to these traffic flows. The policies may include security related policies, access control policies, forwarding policies, enterprise-processing policies, and so on.

In one example embodiment, the network operators pull metadata 304a-n relating to the microservices 302a-n in their enterprise and construct corresponding SD-AVC policies. These policies may use regular expressions such as match "purchase order*" or match "funds transfer", etc. To more tightly couple intent with policy, a common naming schema for the annotations may be defined for the enterprise. For example, the annotation may be structured to include microservice information in a predetermined order such as the name of the enterprise service, the name of the microservice of this enterprise service, name of one or more functions of the microservice, and a security level assigned to the microservice. The annotation in a structured form is based on a common naming schema.

In yet another example embodiment, the metadata 304a-n is not only useful for implementing an application policy with microservice granularity but also serves to provide observability. The metadata 304a-n is extracted, inserted into Flexible NetFlow (FNF) fields, and exported to NetFlow collectors. The network operators are then provided with an end-to-end flow visibility at the microservice level. The metadata 304a-n is provided for analytics and to gather (obtain) telemetry data at a microservice level.

In one example embodiment, the metadata 304a-n includes the DNS name of the respective microservice. According to yet another example embodiment, the metadata 304a-n further includes annotations (e.g., stored in the txt record of the DNS records) to further differentiate various microservices 302a-n from one another. The annotations enable the microservice-based enterprise services to be different across the network and provide visibility of the microservice outside the cluster 202.

The techniques presented herein present a cloud native method for application developers to provide superior application experiences for their microservice based applications across a network. The developers input information about the microservices as annotations in their programming environments. The microservices are then exported to and disseminated by the DNS service 310 to the network devices external to the cluster 202. These techniques thus allow for microservice level of granularity for application policies, including path selection, Quality of Service (QoS), etc. The microservice information enables microservice level visibility to traffic flows across the network for analytics, troubleshooting, and gathering telemetry data.

Figure 4:
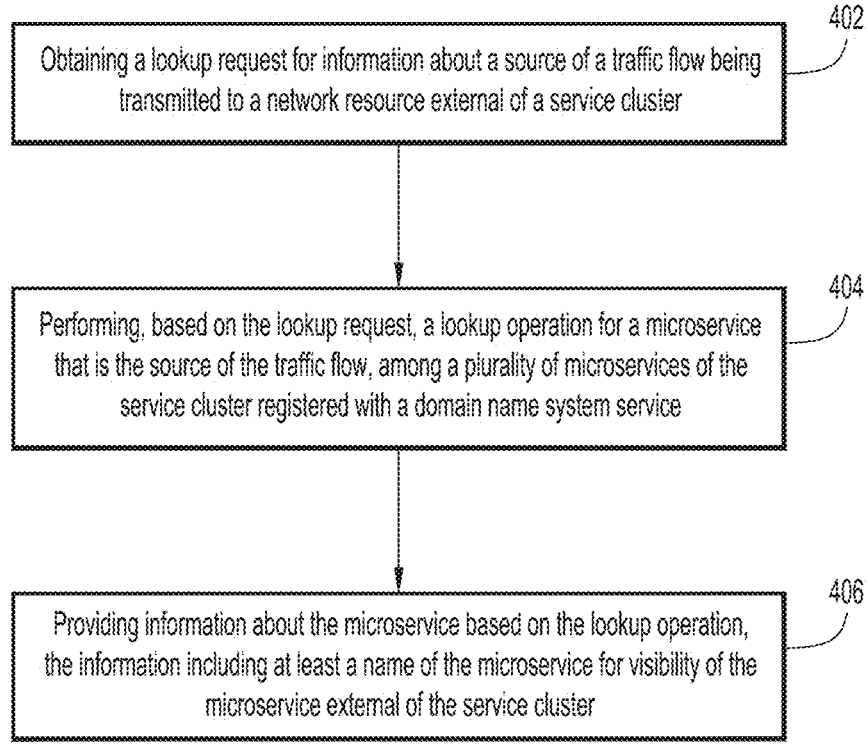
FIG. 4 is a flowchart illustrating a computer-implemented method of providing information about a microservice for visibility and control of a microservice external of a service cluster, according to an example embodiment.

FIG. 4 is a flowchart illustrating a computer-implemented method 400 of providing information about a microservice for visibility of the microservice external of the service cluster. The method 400 may be implemented by one or more computing devices such as servers executing the DNS service of FIGS. 1, 2 and 3A-3F.

At 402, the computer-implemented method 400 involves obtaining, by a domain name system (DNS) service, a lookup request for information about a source of a traffic flow being transmitted to a network resource external of a service cluster.

At 404, the computer-implemented method 400 involves performing, based on the lookup request, a lookup operation for a microservice that is the source of the traffic flow, among a plurality of microservices of the service cluster registered with the DNS service.

At 406, the computer-implemented method 400 involves providing information about the microservice based on the lookup operation. The information includes at least a name of the microservice for visibility of the microservice external of the service cluster.

In one instance, the information further includes metadata about the microservice for applying a network policy specific to the microservice or gathering telemetry data about the microservice.

In one form, the operation 404 of performing the lookup may include obtaining a DNS entry for the microservice that matches a source address specified in the lookup request. The DNS entry includes a textual record that identifies the microservice and one or more functions of the microservice.

According to one or more example embodiments, the computer-implemented method 400 may further involve obtaining, by the DNS service from a point of delivery that hosts the microservice, a registration request that includes an annotation describing the microservice and generating a DNS entry including at least an address of the microservice, a name of the microservice, and metadata about the microservice obtained from the annotation.

In one instance, the annotation is in a structured form based on a common naming schema. The computer-implemented method 400 may further involve parsing the annotation to extract the information about the microservice for generating the metadata of the DNS entry.

In the computer-implemented method 400, the lookup request may include an address of the source of the traffic flow. The operation 404 of performing the lookup operation for the microservice may include performing a reverse DNS lookup for the name of the microservice that matches the address of the source.

In another form, the lookup request may include a source address of the traffic flow based on a DNS domain of the traffic flow obtained from the network resource. The operation 404 of performing the lookup operation for the microservice may include performing a direct DNS lookup for an address of the microservice and the information about the microservice that matches the source address of the lookup request.

FIG. 5 is a hardware block diagram of a computing device 500 that may perform functions associated with any combination of operations in connection with the techniques depicted and described in FIGS. 1-4, including, but not limited to, operations of the computing device or one or more servers that execute the DNS service. Further, the computing device 500 may be representative of one of the working nodes or master nodes. It should be appreciated that FIG. 5 provides only an illustration of one embodiment and does not imply any limitations with regard to the environments in which different embodiments may be implemented. Many modifications to the depicted environment may be made.

In at least one embodiment, computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with one or more memory elements 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to the computing device 500. For example, I/O interface(s) 514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 516, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided that hosts the DNS service of FIGS. 3A-3F. The apparatus includes a memory, a network interface configured to enable network communications, and a processor. The processor is configured to perform various operations. The operations include obtaining a lookup request for information about a source of a traffic flow being transmitted to a network resource external of a service cluster and performing, based on the lookup request, a lookup operation for a microservice that is the source of the traffic flow, among a plurality of microservices of the service cluster registered with a DNS service. The operations further include providing information about the microservice based on the lookup operation. The information includes at least a name of the microservice for visibility of the microservice external of the service cluster.

In yet another example embodiment, one or more non-transitory computer readable storage media encoded with instructions are provided. When the media is executed by a processor, the instructions cause the processor to execute a method involving obtaining a lookup request for information about a source of a traffic flow being transmitted to a network resource external of a service cluster and performing, based on the lookup request, a lookup operation for a microservice that is the source of the traffic flow, among a plurality of microservices of the service cluster registered with a DNS service. The method further includes providing information about the microservice based on the lookup operation. The information includes at least a name of the microservice for visibility of the microservice external of the service cluster.

In yet another example embodiment, a system is provided that includes the devices and operations explained above with reference to FIGS. 1-5.

The programs described herein (e.g., control logic 520) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 506 and/or memory elements(s) 504 can store data, software, code, instructions (e.g., processor instructions), logic, parameters, combinations thereof, and/or the like used for operations described herein. This includes the storage 506 and/or memory elements(s) 504 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Nom Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
obtaining a lookup request for information about a source of a traffic flow being transmitted to a network resource external of a service cluster;
performing, based on the lookup request, a lookup operation for a microservice that is the source of the traffic flow, among a plurality of microservices of the service cluster; and
providing information about the microservice based on the lookup operation for external visibility of the microservice.

2. The computer-implemented method of claim 1, wherein providing the information about the microservice includes providing the information about the microservice outside the service cluster.

3. The computer-implemented method of claim 1, wherein the information about the microservice includes an identification of the microservice for visibility outside the service cluster.

4. The computer-implemented method of claim 1, wherein the information includes metadata about the microservice for applying a network policy specific to the microservice or for gathering telemetry data about the microservice.

5. The computer-implemented method of claim 1, wherein performing the lookup operation includes:
obtaining a textual record that identifies the microservice and one or more functions of the microservice.

6. The computer-implemented method of claim 1, further comprising:
obtaining a registration request that includes an annotation describing the microservice; and
generating a record that includes at least an address of the microservice, an identification the microservice, and metadata about the microservice obtained from the annotation.

7. The computer-implemented method of claim 6, wherein the annotation is in a structured form based on a common naming schema, and further comprising:
parsing the annotation to extract the information about the microservice for generating the metadata of the record.

8. The computer-implemented method of claim 1, wherein the lookup request includes an address of the source of the traffic flow, and performing the lookup operation for the microservice includes:
performing a reverse lookup for an identification of the microservice that matches the address of the source.

9. An apparatus comprising:
a memory;
a network interface configured to enable network communications; and
a processor, wherein the processor is configured to perform operations comprising:
obtaining a lookup request for information about a source of a traffic flow being transmitted to a network resource external of a service cluster;
performing, based on the lookup request, a lookup operation for a microservice that is the source of the traffic flow, among a plurality of microservices of the service cluster; and
providing information about the microservice based on the lookup operation for external visibility of the microservice.

10. The apparatus of claim 9, wherein the processor is configured to provide the information about the microservice by providing the information about the microservice outside the service cluster.

11. The apparatus of claim 9, wherein the information about the microservice includes an identification of the microservice for visibility outside the service cluster.

12. The apparatus of claim 9, wherein the information includes metadata about the microservice for applying a network policy specific to the microservice or for gathering telemetry data about the microservice.

13. The apparatus of claim 9, wherein the processor is configured to perform the lookup operation by:
obtaining a textual record that identifies the microservice and one or more functions of the microservice.

14. The apparatus of claim 9, wherein the processor is further configured to perform additional operations comprising:
obtaining a registration request that includes an annotation describing the microservice; and
generating a record that includes at least an address of the microservice, an identification the microservice, and metadata about the microservice obtained from the annotation.

15. The apparatus of claim 14, wherein the annotation is in a structured form based on a common naming schema and the processor is further configured to perform an additional operation comprising:
parsing the annotation to extract the information about the microservice for generating the metadata of the record.

16. The apparatus of claim 9, wherein the lookup request includes an address of the source of the traffic flow, and the processor is configured to perform the lookup operation for the microservice by:
performing a reverse lookup for an identification of the microservice that matches the address of the source.

17. One or more non-transitory computer readable storage media encoded with instructions that, when executed by a processor, cause the processor to execute a method comprising:
obtaining a lookup request for information about a source of a traffic flow being transmitted to a network resource external of a service cluster;
performing, based on the lookup request, a lookup operation for a microservice that is the source of the traffic flow, among a plurality of microservices of the service cluster; and
providing information about the microservice based on the lookup operation for external visibility of the microservice.

18. The one or more non-transitory computer readable storage media of claim 17, wherein providing the information about the microservice includes providing the information about the microservice outside the service cluster.

19. The one or more non-transitory computer readable storage media of claim 17, wherein the information about the microservice includes an identification of the microservice for visibility outside the service cluster.

20. The one or more non-transitory computer readable storage media of claim 17, wherein the information includes metadata about the microservice for applying a network policy specific to the microservice or for gathering telemetry data about the microservice.

* * * * *

UNITED STATES PATENT AND TRADEMARK OFFICE
CERTIFICATE OF CORRECTION

| | | |
|---|---|---|
| PATENT NO. | : 11,985,107 B2 | Page 1 of 1 |
| APPLICATION NO. | : 18/163979 | |
| DATED | : May 14, 2024 | |
| INVENTOR(S) | : Thomas Szigeti et al. | |

It is certified that error appears in the above-identified patent and that said Letters Patent is hereby corrected as shown below:

On the Title Page

(72) Inventors:
Please replace "Akram Ismail Sheriff, San Jose (CA);" with --Akram Ismail Sheriff, San Jose, CA (US);--

Signed and Sealed this
Twenty-first Day of January, 2025

Coke Morgan Stewart
*Acting Director of the United States Patent and Trademark Office*